(12) United States Patent
Farley et al.

(10) Patent No.: US 7,796,570 B1
(45) Date of Patent: Sep. 14, 2010

(54) METHOD FOR SPARSE TABLE ACCOUNTING AND DISSEMINATION FROM A MOBILE SUBSCRIBER DEVICE IN A WIRELESS MOBILE AD-HOC NETWORK

(75) Inventors: Kevin L. Farley, Orlando, FL (US); Donald L. Joslyn, DeBary, FL (US); Michael A. Ruckstuhl, Orlando, FL (US); Darragh J. Nagle, Altamonte Springs, FL (US)

(73) Assignee: Meshnetworks, Inc., Maitland, FL (US)

( * ) Notice: Subject to any disclaimer, the term of this patent is extended or adjusted under 35 U.S.C. 154(b) by 3041 days.

(21) Appl. No.: 10/193,141

(22) Filed: Jul. 12, 2002

(51) Int. Cl.
H04W 4/00 (2009.01)
H04B 5/00 (2006.01)
H04B 7/00 (2006.01)

(52) U.S. Cl. ............. 370/338; 455/426.1; 455/426.2; 455/41.1

(58) Field of Classification Search ............. 455/426.1, 455/426.2, 464, 406, 453, 41.1, 41.2; 370/338, 370/351, 331; 705/30
See application file for complete search history.

(56) References Cited

U.S. PATENT DOCUMENTS

| 4,494,192 | A | 1/1985 | Lew et al. ............... 364/200 |
| 4,617,656 | A | 10/1986 | Kobayashi et al. ........... 370/74 |
| 4,736,371 | A | 4/1988 | Tejima et al. ............... 370/95 |
| 4,742,357 | A | 5/1988 | Rackley .................. 342/457 |
| 4,747,130 | A | 5/1988 | Ho ....................... 379/269 |
| 4,910,521 | A | 3/1990 | Mellon ................... 342/45 |
| 5,034,961 | A | 7/1991 | Adams ................... 375/130 |
| 5,068,916 | A | 11/1991 | Harrison et al. ............. 455/39 |
| 5,231,634 | A | 7/1993 | Giles et al. ............... 370/95.1 |
| 5,233,604 | A | 8/1993 | Ahmadi et al. ............. 370/60 |
| 5,241,542 | A | 8/1993 | Natarajan et al. .......... 370/95.3 |
| 5,317,566 | A | 5/1994 | Joshi ...................... 370/60 |
| 5,392,450 | A | 2/1995 | Nossen ................... 455/12.1 |
| 5,412,654 | A | 5/1995 | Perkins .................. 370/94.1 |
| 5,424,747 | A | 6/1995 | Chazelas ................... 342/70 |
| 5,502,722 | A | 3/1996 | Fulghum .................. 370/69.1 |
| 5,517,491 | A | 5/1996 | Nanni et al. ................ 370/29 |

(Continued)

FOREIGN PATENT DOCUMENTS

CA 2132180 3/1996

(Continued)

OTHER PUBLICATIONS

Wong et al., "Soft Handoffs in CDMA Mobile Systems", Dec. 1997, IEEE Personal Communications.
Wong et al., "A Pattern Recognition System for Handoff Algorithms", Jul. 2000, IEEE Journal on Selected Areas in Communications, vol. 18, No. 7.

(Continued)

*Primary Examiner*—Tilahun Gesesse
(74) *Attorney, Agent, or Firm*—Randi L. Karpinia; Joseph J. Buczynski

(57) ABSTRACT

A system and method for performing continuous accounting on a mobile node within a wireless ad-hoc network, using a sparse matrix method for compaction of the accounting data when forwarding data to a core network. The system and method perform continuous accounting of network traffic on a mobile node, and collected data is periodically transmitted in summary report form to a core network when accessible. During periods when the core network is inaccessible, collected data is maintained for subsequent transmission to the core network once access is re-established.

22 Claims, 5 Drawing Sheets

U.S. PATENT DOCUMENTS

| | | | | |
|---|---|---|---|---|
| 5,555,425 | A | 9/1996 | Zeller et al. | 395/800 |
| 5,555,540 | A | 9/1996 | Radke | 370/16.1 |
| 5,572,528 | A | 11/1996 | Shuen | 370/85.13 |
| 5,615,212 | A | 3/1997 | Ruszczyk et al. | 370/433 |
| 5,618,045 | A | 4/1997 | Kagan et al. | 463/40 |
| 5,621,732 | A | 4/1997 | Osawa | 370/79 |
| 5,623,495 | A | 4/1997 | Eng et al. | 370/397 |
| 5,627,976 | A | 5/1997 | McFarland et al. | 395/308 |
| 5,631,897 | A | 5/1997 | Pacheco et al. | 370/237 |
| 5,644,576 | A | 7/1997 | Bauchot et al. | 370/437 |
| 5,652,751 | A | 7/1997 | Sharony | 370/227 |
| 5,680,392 | A | 10/1997 | Semaan | 370/261 |
| 5,684,794 | A | 11/1997 | Lopez et al. | 370/337 |
| 5,687,194 | A | 11/1997 | Paneth et al. | 375/283 |
| 5,696,903 | A | 12/1997 | Mahany | 395/200.58 |
| 5,701,294 | A | 12/1997 | Ward et al. | 370/252 |
| 5,706,428 | A | 1/1998 | Boer et al. | 395/200 |
| 5,717,689 | A | 2/1998 | Ayanoglu | 370/349 |
| 5,745,483 | A | 4/1998 | Nakagawa et al. | 370/335 |
| 5,774,876 | A | 6/1998 | Wooley et al. | 705/28 |
| 5,781,540 | A | 7/1998 | Malcolm et al. | 370/321 |
| 5,787,080 | A | 7/1998 | Hulyalkar et al. | 370/348 |
| 5,794,154 | A | 8/1998 | Bar-On et al. | 455/509 |
| 5,796,732 | A | 8/1998 | Mazzola et al. | 370/362 |
| 5,796,741 | A | 8/1998 | Saito et al. | 370/439 |
| 5,805,593 | A | 9/1998 | Busche | 370/396 |
| 5,805,842 | A | 9/1998 | Nagaraj et al. | 395/306 |
| 5,805,977 | A | 9/1998 | Hill et al. | 455/31.3 |
| 5,809,518 | A | 9/1998 | Lee | 711/115 |
| 5,822,309 | A | 10/1998 | Ayanoglu et al. | 370/315 |
| 5,844,905 | A | 12/1998 | McKay et al. | 370/443 |
| 5,845,097 | A | 12/1998 | Kang et al. | 395/297 |
| 5,857,084 | A | 1/1999 | Klein | 395/309 |
| 5,870,350 | A | 2/1999 | Bertin et al. | 365/233 |
| 5,877,724 | A | 3/1999 | Davis | 342/357 |
| 5,881,095 | A | 3/1999 | Cadd | 375/202 |
| 5,881,372 | A | 3/1999 | Kruys | 455/113 |
| 5,886,992 | A | 3/1999 | Raatikainen et al. | 370/410 |
| 5,896,561 | A | 4/1999 | Schrader et al. | 455/67.1 |
| 5,903,559 | A | 5/1999 | Acharya et al. | 370/355 |
| 5,909,651 | A | 6/1999 | Chander et al. | 455/466 |
| 5,943,322 | A | 8/1999 | Mayor et al. | 370/280 |
| 5,987,011 | A | 11/1999 | Toh | 370/331 |
| 5,987,033 | A | 11/1999 | Boer et al. | 370/445 |
| 5,991,279 | A | 11/1999 | Haugli et al. | 370/311 |
| 6,028,853 | A | 2/2000 | Haartsen | 370/338 |
| 6,029,217 | A | 2/2000 | Arimilli et al. | 710/107 |
| 6,034,542 | A | 3/2000 | Ridgeway | 326/39 |
| 6,044,062 | A | 3/2000 | Brownrigg et al. | 370/238 |
| 6,047,330 | A | 4/2000 | Stracke, Jr. | 709/238 |
| 6,052,594 | A | 4/2000 | Chuang et al. | 455/450 |
| 6,052,752 | A | 4/2000 | Kwon | 710/126 |
| 6,064,626 | A | 5/2000 | Stevens | 365/233 |
| 6,067,291 | A | 5/2000 | Kamerman et al. | 370/338 |
| 6,073,005 | A | 6/2000 | Raith et al. | 455/404 |
| 6,078,566 | A | 6/2000 | Kikinis | 370/286 |
| 6,104,712 | A | 8/2000 | Robert et al. | 370/389 |
| 6,108,738 | A | 8/2000 | Chambers et al. | 710/113 |
| 6,115,580 | A | 9/2000 | Chuprun et al. | 455/1 |
| 6,122,690 | A | 9/2000 | Nannetti et al. | 710/102 |
| 6,130,881 | A | 10/2000 | Stiller et al. | 370/238 |
| 6,132,306 | A | 10/2000 | Trompower | 453/11.1 |
| 6,147,975 | A | 11/2000 | Bowman-Amuah | 370/252 |
| 6,163,699 | A | 12/2000 | Naor et al. | 455/453 |
| 6,178,337 | B1 | 1/2001 | Spartz et al. | 455/561 |
| 6,192,053 | B1 | 2/2001 | Angelico et al. | 370/448 |
| 6,192,230 | B1 | 2/2001 | Van Bokhorst et al. | 455/343 |
| 6,208,870 | B1 | 3/2001 | Lorello et al. | 455/466 |
| 6,223,240 | B1 | 4/2001 | Odenwald et al. | 710/129 |
| 6,240,294 | B1 | 5/2001 | Hamilton et al. | 455/456 |
| 6,246,875 | B1 | 6/2001 | Seazholtz et al. | 455/432 |
| 6,249,516 | B1 | 6/2001 | Brownrigg et al. | 370/338 |
| 6,275,707 | B1 | 8/2001 | Reed et al. | 455/456 |
| 6,285,892 | B1 | 9/2001 | Hulyalkar | 455/574 |
| 6,304,556 | B1 | 10/2001 | Haas | 370/254 |
| 6,327,300 | B1 | 12/2001 | Souissi et al. | 375/219 |
| 6,349,091 | B1 | 2/2002 | Li | 370/238 |
| 6,349,210 | B1 | 2/2002 | Li | 455/450 |
| 6,574,465 | B2 * | 6/2003 | Marsh et al. | 455/406 |
| 6,853,630 | B1 * | 2/2005 | Manning | 370/338 |
| 6,904,017 | B1 * | 6/2005 | Meempat et al. | 370/238 |
| 2001/0053699 | A1 | 12/2001 | McCrady et al. | 455/513 |
| 2003/0087645 | A1 * | 5/2003 | Kim et al. | 455/453 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

US 7,796,570 B1

METHOD FOR SPARSE TABLE ACCOUNTING AND DISSEMINATION FROM A MOBILE SUBSCRIBER DEVICE IN A WIRELESS MOBILE AD-HOC NETWORK

BACKGROUND OF THE INVENTION

1. Field of the Invention

The present invention relates to a system and method of accounting and reporting network traffic information on mobile nodes within an ad-hoc network. More particularly, the present invention relates to a system and method for implementing continuous accounting of network traffic information on individual mobile nodes and providing a sparse matrix method for compaction of collected data for periodic transmission to the core network when accessible.

2. Description of the Related Art

In recent years, a type of mobile communications network known as an "ad-hoc" network has been developed to address the needs of multiple mobile device communication beyond traditional infrastructure coverage. In this type of network, each user terminal (hereinafter "mobile node") is capable of operating as a base station or router for other mobile nodes within the network, thus eliminating the need for a fixed infrastructure of base stations. Accordingly, data packets being sent from a source mobile node to a destination mobile node are typically routed through a number of intermediate mobile nodes before reaching the destination node.

More sophisticated ad-hoc networks are also being developed which, in addition to enabling mobile nodes to communicate with each other as in conventional ad-hoc networks, further enable the mobile nodes to access fixed networks and communicate with other types of user terminals, such as those on the public switched telephone network (PSTN) and the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004, and in U.S. Pat. No. 6,873,839 entitled "Prioritized-Routing for an Ad-Hoc, Peer-to-Peer, Mobile Radio Access System", issued on Mar. 29, 2005, the entire content of each being incorporated herein by reference.

Generally, all nodes in a wireless ad-hoc peer-to-peer network provide similar services and functionality. Therefore, peer-to-peer networks distinguish themselves from traditional infrastructure networks, where one or more nodes offer a superset of the functionality of the rest of the network. In traditional networks, nodes seek out infrastructure nodes to provide services individual nodes are unable to perform. These infrastructure nodes are normally discovered by broadcast traffic advertisements from their client nodes in a network. Infrastructure nodes in traditional networks typically perform. Dynamic Host Configuration Protocol (DHCP), Address Resolution Protocol (ARP), as well as other services that depend on broadcast traffic. Services such as Dynamic Host Configuration Protocol, defined by IETF RFC 2131 and 2132, the entire content of each being incorporated herein by reference, are used by a node to automatically obtain network settings from a central server, including the node's IP address, the address of Domain Name Servers (DNS), the IP address of default gateways, and many other network settings. Additional services, such as Address Resolution Protocol, defined by STD 0037 and RFC 0826, the entire content of each being incorporated herein by reference, are used by network nodes to map IP addresses to MAC addresses so that IP traffic can be delivered to specific hardware.

Peer-to-peer networks typically do not contain specialized infrastructure nodes. Therefore, as a result of the limited infrastructure dependence in an ad-hoc network, each wireless node is tasked with greater individual functions. However, the execution of wider functions at an individual node requires several advancements at the node level. For instance, in a resource-limited mobile ad-hoc network where there are no specialized infrastructure nodes for managing task activity accounting, there may be insufficient means to collect usage data from the mobile nodes in the network. Such data may include the number of data packets sent, packets received or packets routed by a mobile node. This information may be used in network capacity determinations, as well as usage billing reports for individual nodes. As this information is generated by mobile nodes, but processed at core network elements, collecting and transmitting such data in a wireless ad-hoc network requires that the mobility of the nodes be taken into account.

Attempts to direct individual mobile nodes to collect and provide usage information face difficulties resulting from the fact that mobile devices in the ad-hoc network may spend considerable time beyond the communication range of the core network elements where accounting processing functions are performed in typical systems. The intermittent nature of ad-hoc connections resulting from mobile devices creates a need for a method and system to perform accounting of network traffic on individual subscriber nodes during all periods, including periods when the nodes are beyond the range of the core network and the traditional accounting services provided. However, collection and maintenance of usage data at the subscriber node must use minimal overhead resources so as not to burden the network, or the node, with the accounting task.

Accordingly, a need exists for a system and method for continuous accounting on individual mobile nodes, using a method for compaction of the accounting data when forwarding the collected information to the core network, such that impact on overhead resources is minimal.

SUMMARY OF THE INVENTION

An object of the present invention is to provide a system and method for performing sparse table accounting and dissemination from a mobile node in a wireless ad-hoc network.

Another object of the present invention is to provide a system and method for collecting and storing node usage information at an individual mobile node in a wireless ad-hoc network.

Still another object of the present invention is to prepare a summary report of collected data for transmission to a core network during periods when the core network is accessible, and maintain data collection during periods when the core network is inaccessible for later transmission.

These and other objects are substantially achieved by providing a system and method for implementing continuous accounting of network traffic on a mobile node within a wireless ad-hoc network, and using a sparse matrix method for compaction of the accounting data when forwarding to core network elements when within communication range. The embodiment of the present invention works for situations when the node has initially been in contact with the core network before periods of connection loss, and when the node has initially come up dark, with no connection to the core network, and then periodically establishes connection with the core network.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
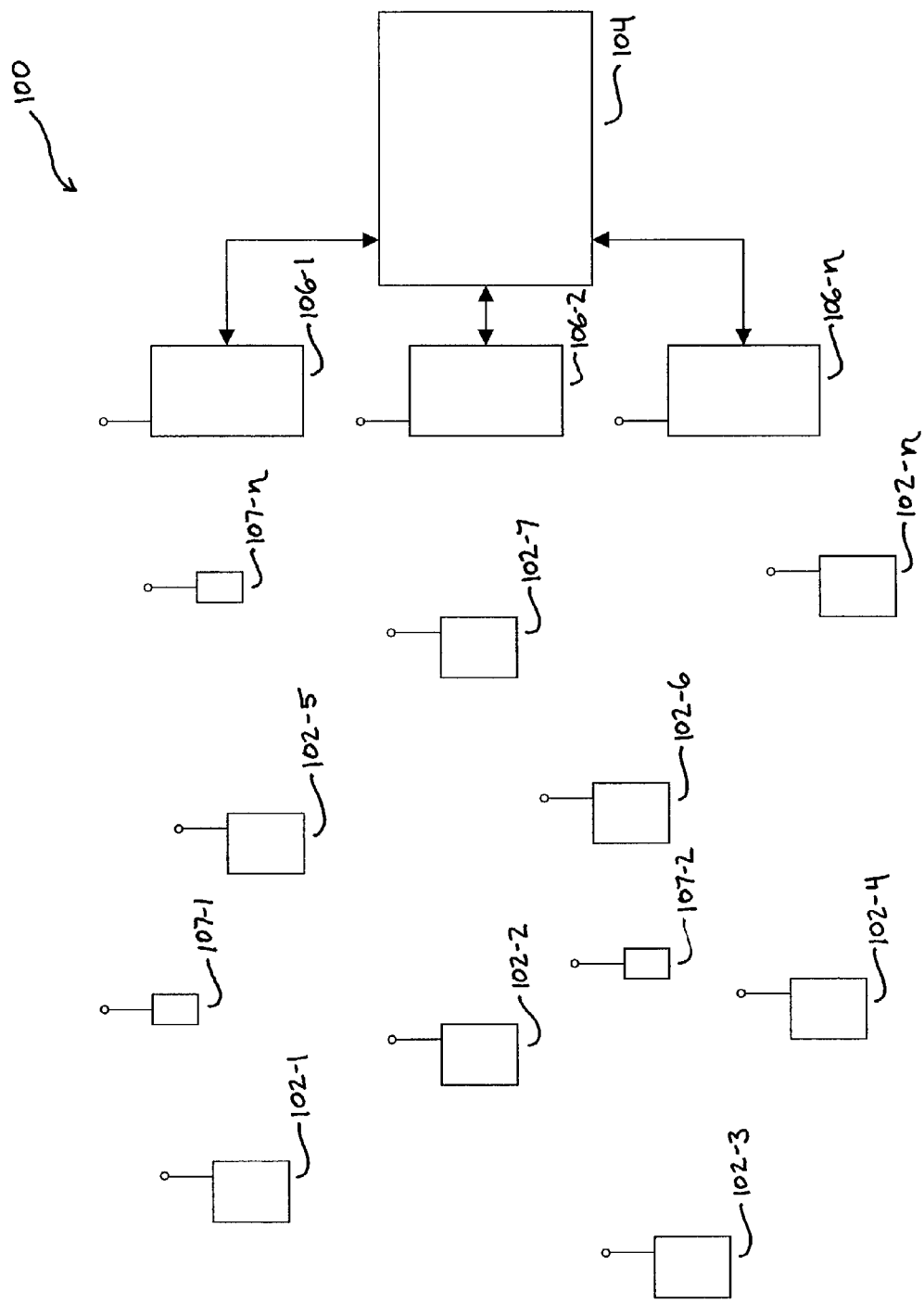
FIG. 1 is a block diagram of an example of an ad-hoc wireless communications network including a plurality of nodes employing an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers, to provide network nodes with access to other networks, such as other ad-hoc networks, the public switched telephone network (PSTN) and the Internet. The fixed network 104 also contains core network elements including node usage accounting systems that collect and correlate system accounting data for reporting to follow-on billing systems. The core network elements of the fixed network 104 may interface with nodes 102 through aggregation points, such as intelligent access points (IAPs) 106, to provide a link between nodes 102 and the accounting systems.

The network 100 may also include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, which is incorporated herein by reference, and in U.S. patent application Ser. Nos. 09/897,790, 09/815,157 and 09/815,164, referenced above.

Figure 2:
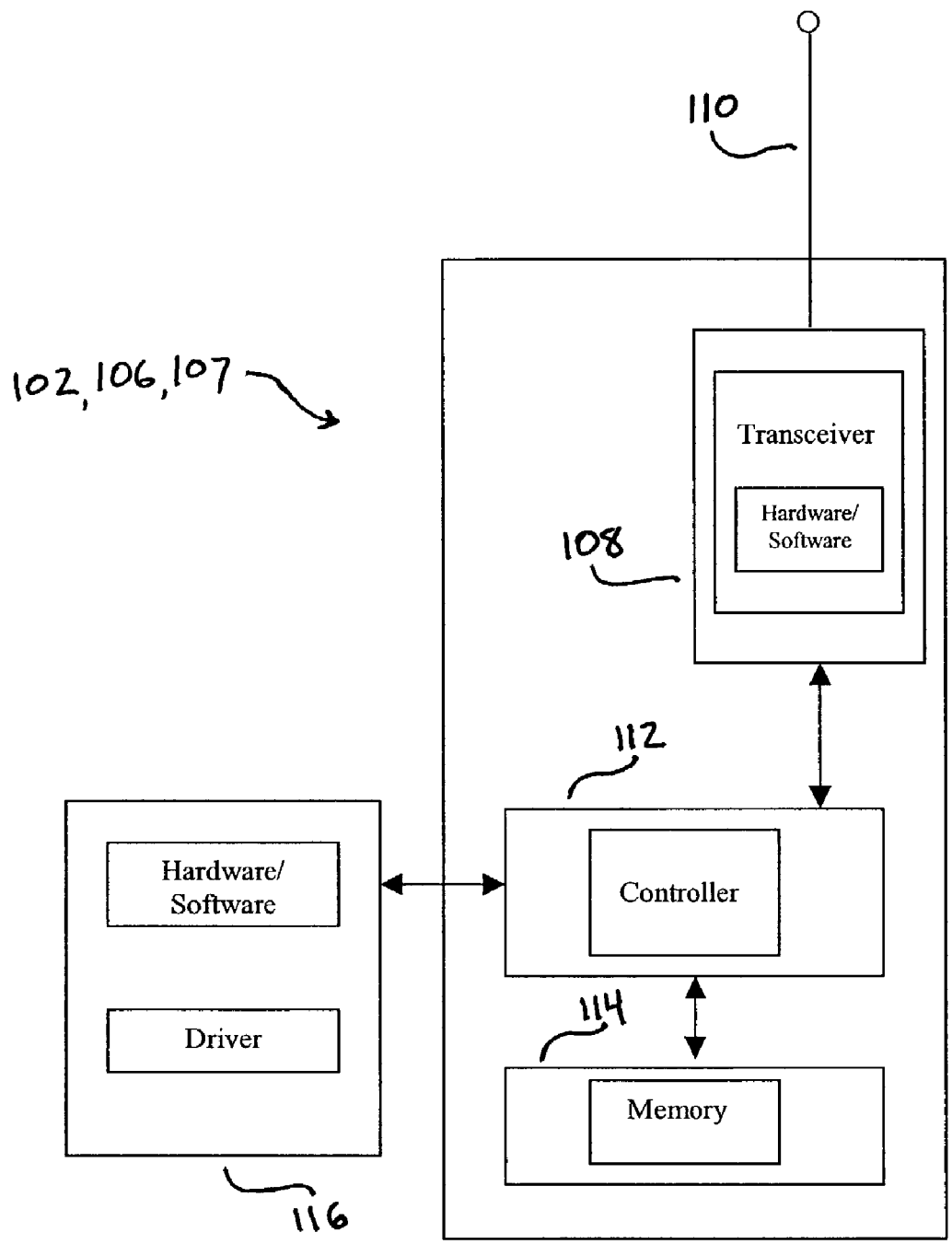
FIG. 2 is a block diagram of an example of a wireless node as shown in FIG. 1.

As shown in FIG. 2, each node 102, 106 and 107 includes a transceiver 108 which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM), that is capable of storing, among other things, routing information pertaining to itself and other nodes in the network 100. The nodes 102, 106 and 107 exchange their respective routing information, referred to as routing advertisements or routing table information, with each other via a broadcasting mechanism periodically, for example, when a new node enters the network 100, or when existing nodes in the network 100 move.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included. Each node 102, 106 and 107 also includes accounting software which allows each node to summarily count, store and process values regarding operations executed by the individual node. The accounting software at each node 102, 106 and 107 may be configured, based upon node type, to direct a counting mechanism to continuously count specific packet occurrences at the node and store count data in the memory 114. The accounting software also allows each node to prepare summary reports from count data for periodic transmission by the transceiver 108.

In FIG. 1, the dispersion of nodes throughout the network 100 may result in the mobile nodes 102 spending considerable time beyond communication range of the fixed network 104, where node usage data accounting is typically performed in wire-line systems. For purposes of this description, only the core accounting and billing system network elements, which can be part of the core network 104 or accessible via the core network 104, are shown in the fixed network 104. The mobile nodes 102 may establish, break, then re-establish connections with the core network 104 often as they move about the network 100. The intermittent nature of direct ad-hoc connections between mobile nodes 102 and the core network 104 requires network traffic accounting methods for mobile nodes to perform regardless of communications with the core network 104. The embodiment of the present invention discussed below implements a continuous accounting method and system on individual mobile nodes 102, and uses a sparse matrix method for compaction of collected accounting data when forwarding to the core network 104.

In FIG. 1, a mobile node 102 may freely move about and operate at various locations within the network 100. Depending upon node location, the node may or may not be able to communicate with the fixed network 104. Also, at various points within network 100, a node may be unable to communicate with either the fixed network 104, other nodes or routers. Regardless of position however, continuous node usage data collection and processing is required to provide accurate billing for services provided. To achieve this, the embodiment of the present invention described below directs the continuous collection of node usage information at each node, regardless of communication gaps existing between node 102 and accounting systems located on the fixed network 104. Subsequent usage data transmissions from node 102 to the fixed network 104 only occur when the fixed network is within communication range.

Figure 3:
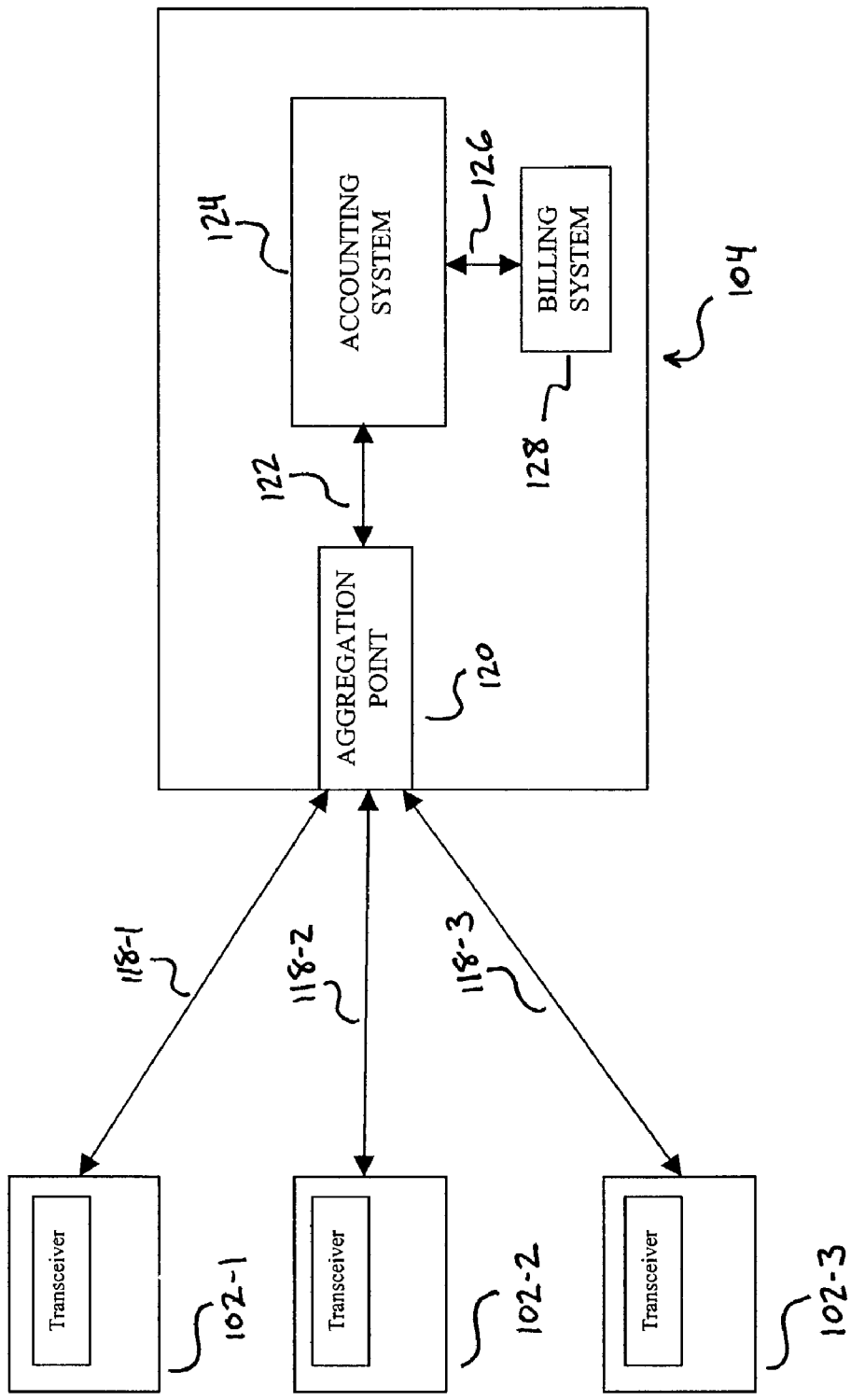
FIG. 3 is a block diagram illustrating an example of the collection of accounting data from wireless mobile nodes in the network shown in FIG. 1 in accordance with an embodiment of the present invention.

FIG. 3 shows an example of three mobile nodes in a wireless ad-hoc network implementing one embodiment of the present invention. In FIG. 3, three mobile nodes, for example, nodes 102-1, 102-2 and 102-3 referred to generally as nodes 102, are within communication range of the core network 104. Although the embodiment shown in FIG. 3 shows nodes 102 within communication range of the core network 104, one or more nodes 102 may be beyond communication range, entering communication range or exiting communication range, at any given time.

In FIG. 3, each node 102-1, 102-2 and 102-3 includes a transceiver as described above with regard to FIG. 2 which allows communication with the aggregation point 120 of the core network 104 via wireless links 118-1, 118-2 and 118-3, respectively. The aggregation point 120 is the point of attachment for each multiple wireless node 102 to the wired core network 104 via the link 122. As described earlier, the core network 104 provides a central accounting system 124 that collects and correlates system accounting data for reporting to a follow-on billing system 128 via a connection 126.

In FIG. 3, whenever a node 102 is within communication range of the core network 104, the transceiver of the node will periodically send collected node usage data to the designated aggregation point 120 in the core network 104 which can be, for example, an IAP 106 with which the node 102 is associated. The node 102 sends data to the aggregation point 120 where data is collected for several nodes over several accounting periods before being sent to the accounting system 124 in network 104.

However, whenever a node 102 loses communication with the core network 104 for any reason, the transceiver of the node 102 disables sending accounting data to the aggregation point, as the data would be lost. During periods where the node 102 is unable to communicate usage data to the core network 104, the node continues collecting usage data, maintained in data registers, until a connection to the core network is re-established. Within each node 102 the accounting software package directs a counting mechanism to continuously count operations executed by the node. Total counts are stored individually in a data register in persistent or non-persistent data storage. Although either storage method may be used, or a combination of both methods, one advantage to the use of persistent storage is that accounting data is generated when the total time the transceiver is in use, from power up to power-off, is less than the accounting reporting cycle. Once the connection to the core network 104 is re-established by the node 102, the accounting data of the data register is prepared and sent as a summary report, containing count totals since the last reporting occurred.

Data at each node 102 in FIG. 3 is collected for the duration of an accounting "cycle", defined as the period between summary report transmissions, and maintained as cumulative totals between acknowledged reports. The accounting cycle may be any duration such that cumulative counts do not overflow counters, or loss of accounting data due to a failure in the transceiver or delivery mechanism is not significant. The accounting cycle may also be restricted to a duration that is shorter than the expected minimum time the transceiver will be powered on under normal operating scenarios.

For example, an accounting cycle of approximately 3 minutes would not overflow a 32-bit counter even at maximum data rates in typical wireless Wide Area Network (WAN) systems. Additionally, the loss of a single 3-minute report is statistically insignificant over a month's billing cycle. Furthermore, the 3-minute cycle would typically be much shorter than most mobile node users' online habits.

If a mobile node user were to attempt to take advantage of this cycle to minimize monthly statistics by limiting all connections to less than the accounting cycle, mechanisms could be included in the system to look for this behavior and provide a means to direct the individual node to implement a shorter accounting cycle. Using system monitoring in the core network and random accounting audits in the nodes, system abusers and fraud can easily be detected.

As stated earlier, the accounting software at nodes 102 directs the counting of specific occurrences at the individual node. Each node 102 counts usage traffic in terms of

- data packets/octets delivered to the attached host through the transceiver;
- data packets/octets sent from the attached host through the transceiver;
- data packets/octets routed though the transceiver that do not originate/terminate at the attached host;
- special service packets/octets transmitted to/from the transceiver, such as location updates for location services; and
- time-based metrics, such as up-time, device time available for routing and so on.

Figure 4:
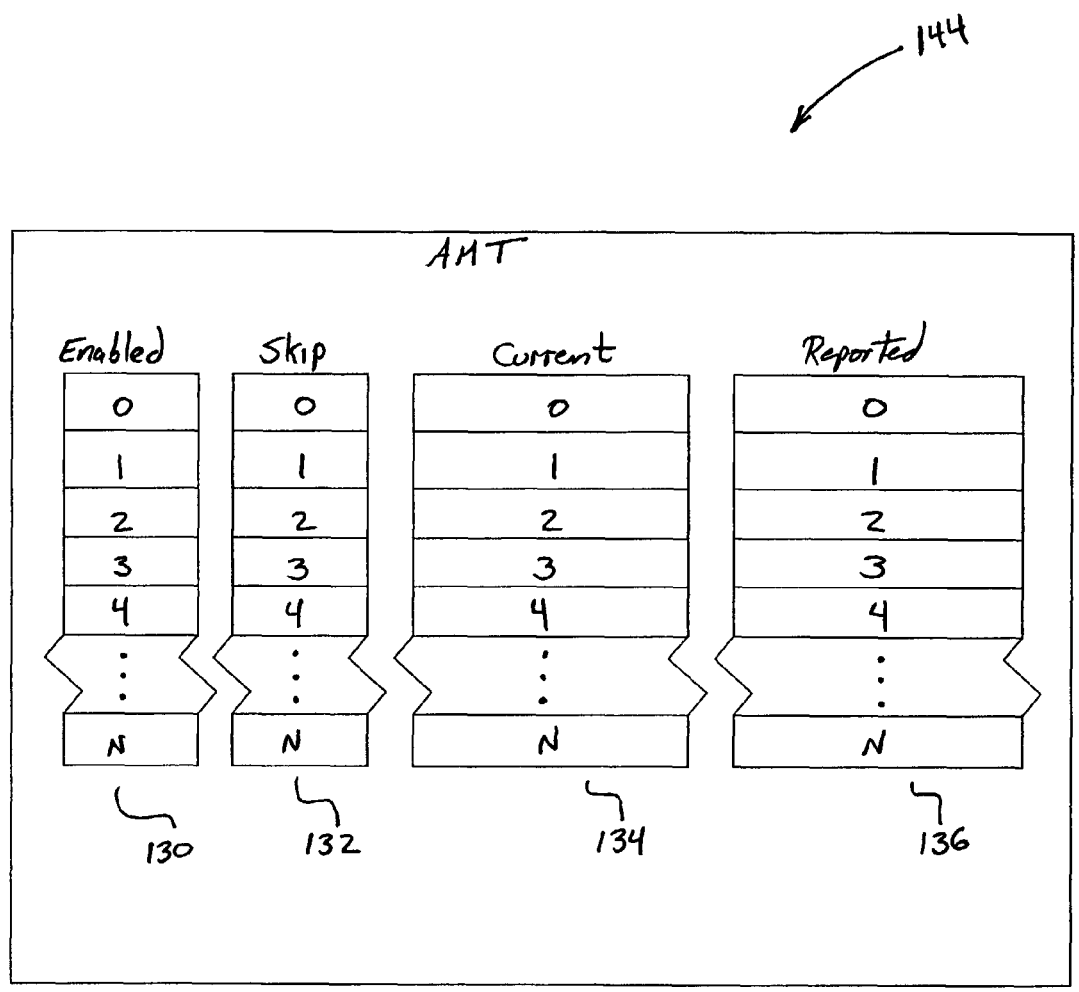
FIG. 4 is a block diagram illustrating an example of the elements of an Accounting Metrics Table (AMT) used by the network shown in FIG. 1 in accordance with an embodiment of the present invention.

Counter values at each node 102 are accumulated and stored in a data register configured as an Accounting Metrics Table (AMT) in this example as shown in FIG. 4. The AMT 144 of FIG. 4 is shown including an enabled column 130, a skip column 132, a current value column 134 and a last reported value column 136. The AMT can include counter data for N different counters, where each counter may be associated with a different packet occurrence at the node where the AMT is located. For example, counter 1 of the AMT located at node 102-1 may be used to store the total number of data packets delivered to the attached host through the transceiver of node 102-1. Counter 2 may be used to store the total number of data octets sent from the attached host through the transceiver of node 102-1, and so forth. The AMT of each node 102-1, 102-2 and 102-3 may be configured the same, or each node may include a uniquely configured AMT based upon the nodes function. Therefore, the configuration of the AMT shown in FIG. 4 is presented to illustrate an embodiment of the present invention, however the AMT may be modified as required by other embodiments.

In the AMT 144 of FIG. 4, the enabled column 130 may be used to indicate counters currently enabled or disabled, requiring update and transmission only when enabled. The skip column 132 may be used to indicate values which have been skipped in previous reports. The previously reported column 134 may be used to show the counter value reported in the last transmission, and may be compared with the current counter value column 134 to determine the amount of change which has occurred. The change in values may further be analyzed to determine if the change is statistically significant for transmission considerations.

The current counter value column 134 in FIG. 4 includes the current cumulated counter total for a specific packet occurrence. Up to N counter total values may be retained in the AMT 144, which is limited only by overhead storage and transmission restrictions of the node at which the AMT is located. The AMT 144 is continuously updated for the duration of the accounting cycle of the node, and as enable/disable and skip decisions are made. All counters are subject to further specification by resolving specific Quality of Service (QoS) or Grade of Service (GoS) levels and categories.

In FIG. 3, the transmission of AMT data from each node 102 to the aggregation point 120 occurs at specific intervals, based upon the application, and may be altered through the use of a timer or counter working in conjunction with the accounting software, located at each node. Upon timer expiration and detection of the core network 104, the accounting software of the node 102 decides which counters of the AMT are to be transmitted to the aggregation point 120 based upon routing criteria that includes several factors. Prior to transmission, the node 102 will evaluate the AMT table to determine which counter values are to be included in a summary report for transmission to the core network 104. If a specific counter in the AMT is enabled, as indicated in the enable column of the AMT table, or if the counter value is statistically significant, that is, above a minimum threshold value, the node 102 will elect to include the counter value in the summary report. Also, if a counter value in the AMT is becoming stale, such as when the counter value has been skipped in previous transmissions up to a maximum threshold number of times as indicated in the skip column 132 of the AMT table 144, the node will elect to include the counter value in the summary report. The result of each determination is used by the accounting software of each node 102 to decide which counters are to be included in the next transmission, and which counters are not to be included. At this point, the node 102 may also decide to revise the enable/disable and skip columns of the AMT 144 for use in subsequent transmission decisions, based upon the current transmission decision made.

Although the transmission of AMT data from each node 102 to the aggregation point 120 occurs at specific intervals, interruptions in transmissions occur when node 102 is beyond communication range of the core network 104. During periods when the core network is inaccessible, node 102 continues data collection, and updates to the AMT 144, but summary report preparation and transmission is stopped until, at some subsequent specific interval, the core network 104 becomes accessible to node 102 once again. Specifically, accounting data is collected at node 102 for the duration of an accounting cycle and maintained as cumulative totals between summary report transmissions. If the core network 104 remains inaccessible for multiple accounting cycles, cumulative totals of each cycle are maintained from the time of the last summary report transmission until the subsequent summary report transmission. Once the core network 104 becomes accessible again, the node 102 will again evaluate the AMT table to determine which counter values are to included in a summary report for transmission to the core network 104, and a summary report is prepared and sent to the core network 104 for processing.

Figure 5:
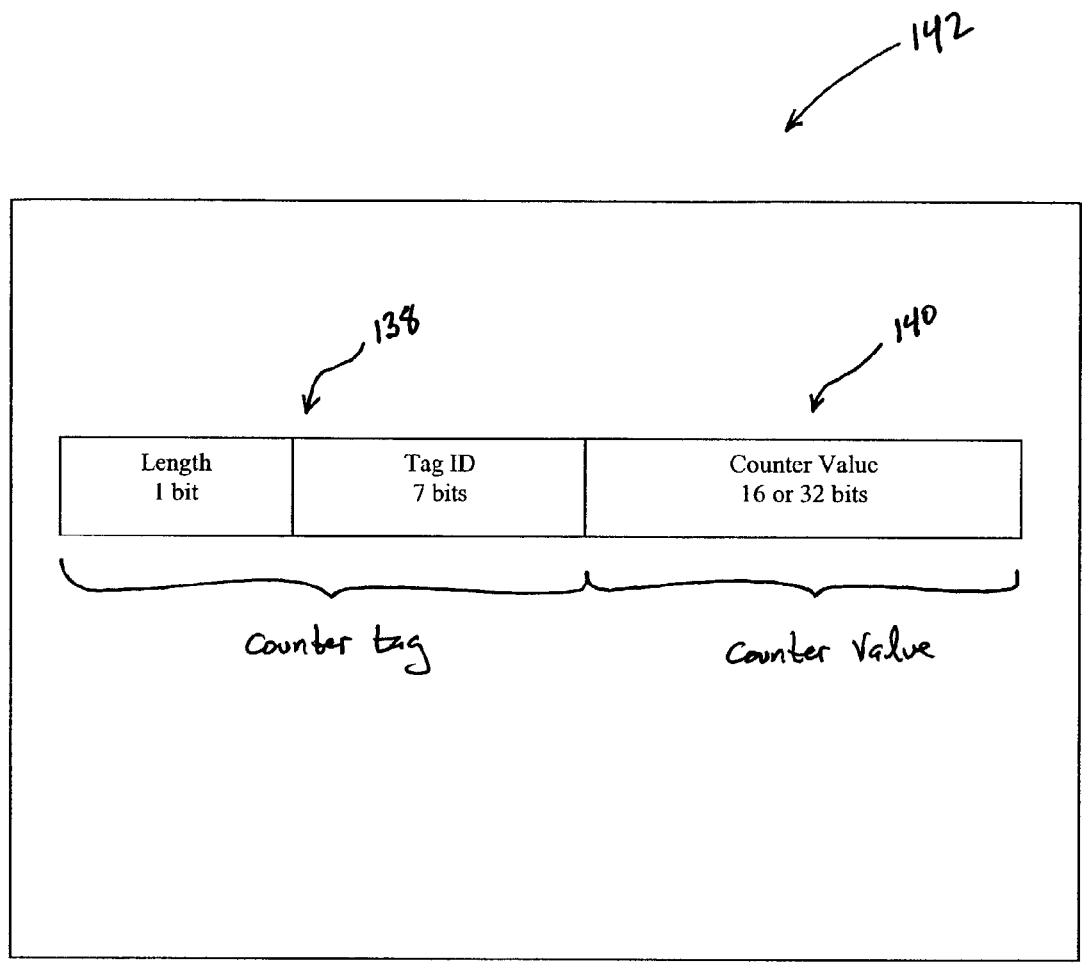
FIG. 5 is a block diagram illustrating an example of counter tagging for transmission as performed by nodes in the network shown in FIG. 1 in accordance with an embodiment of the present invention.

In the embodiment of the present invention described above, each current counter value 134 of the AMT 144 in FIG. 4 is indexed by a specific counter tag ID. When transmitting summary reports of AMT data, nodes 102 construct a packet containing sets of tuples, or records, consisting of a counter tag ID followed by the correctly sized counter value as shown in FIG. 5. FIG. 5 shows a sparse matrix counter tagging example 142 employed in an embodiment of the present invention. The counter tagging of FIG. 5 is shown using a one-octet counter tag 138 and either a 2 or 4 octet counter value field 140 for use in the transmission of AMT values to core network 104 via the aggregation point 120. In FIG. 5, 1 bit of the counter tag is reserved for the length selector and 7 bits are reserved for unique counter tags. The counter tag in the tuples is encoded with a length selector that identifies the length of the counter value field.

The embodiment of the present invention described above further conserves bandwidth on transmission of data to the aggregation point 120 from the node 102 by compressing out null counters, or statistically insignificant counters, in the AMT. The data is sent at Layer 2, using a link-layer transport mechanism as a security enhancement. By keeping the transport mechanism at Layer 2, the node 102 can dump the accounting data to the core network 104 without having to negotiate a Layer 3 connection (i.e. IP address assignment). Sending data at Layer 2 is achieved by piggy-backing data on an existing message transmission, which also conserves bandwidth and minimizes the impact on system capacity. The data transmission can not be corrupted or spoofed using IP protocols, and node 102 may further use encoding, such as Basic Encoding Rules (BER), to encode the counter length, thereby alleviating the need for a' priori knowledge of lengths by downstream processing elements.

A further embodiment of the present invention may also include a mechanism to alter the accounting reporting cycle depending upon variations at the individual node. For example, if the normal duty cycle for reporting is 3 minutes and the node is currently inactive, or has very slow counter advancement indicating low usage, or uptime is significantly long, the node may begin to lengthen the accounting reporting cycle. Adjustments to the accounting reporting cycle may be implemented by either changing the duty cycle or skipping duty cycles. Such a duty cycle modification would save significant bandwidth and be useful as long as the statistical probability that the node user will remain online and the impact of losing the longer accounting data is acceptable.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method of operation of a mobile node for data collection and communication, said mobile node operating within an ad-hoc wireless network, said method comprising:
    collecting node usage data of said mobile node and preparing a summary report of said collected data;
    enabling periodic transmission of said summary report to a core network element during periods when said core network element is accessible; and
    disabling said periodic transmission, and maintaining and updating said summary report during periods when said core network element is inaccessible by said mobile node.

2. A method as claimed in claim 1, wherein said collecting said node usage data includes operating a counting mechanism to collect said usage data comprising separate counts of packet occurrences at said mobile node.

3. A method as claimed in claim 2, wherein said separate counts of packet occurrences are selected from a group comprising separate counts of at least one of the following:
    number of data packets and/or octets delivered to said mobile node;
    number of data packets and/or octets sent from said mobile node;
    number of data packets and/or octets routed though said mobile node; and
    number of special service packets and/or octets transmitted to and/or from said mobile node.

4. A method as claimed in claim 1, wherein said collecting said node usage data includes storing said collected node usage data as counter values in an Accounting Metrics Table (AMT), wherein said stored counter values are indexed by a specific counter tag identification (ID).

5. A method as claimed in claim 4, wherein said summary report comprises counter values and counter tag IDs selected from said AMT, wherein a counter value and tag ID are selected if:
   said counter value and tag ID is the product of an enabled counter;
   said counter value and tag is statistically significant; or
   said counter value and tag has been omitted from previous reports beyond an allowed value.

6. A method as claimed in claim 1, wherein said collecting said node usage data is performed so that said node usage data is collected for a duration of an accounting cycle, comprising a time between which a first summary report and a second summary report is transmitted.

7. A method as claimed in claim 6, wherein said accounting cycle is selectable.

8. A method as claimed in claim 1, wherein said transmission comprises a packet containing a set of tuples, each tuple of said packet containing a counter tag identification (ID) followed by a correctly sized counter value.

9. A method as claimed in claim 8, wherein at least one bit of said counter tag ID is reserved for a length selector, and at least one other bit of said tag ID is reserved for unique counter tags, said counter tags in said tuples being encoded with a length selector that identifies a length of a counter value field for said counter values.

10. A method as claimed in claim 1, wherein said enabling periodic transmission includes using a link-layer transport mechanism to periodically transmit said summary report.

11. A method as claimed in claim 1, wherein said core network elements comprise node usage accounting and billing systems.

12. An ad-hoc wireless network for providing continuous accounting of network traffic information, comprising:
   a mobile node for collecting node usage data associated with the mobile node, preparing a summary report of the collected node usage data, and enabling periodic transmission of the summary report to a core network element during periods when the core network element is accessible by the mobile node,
   wherein the mobile node disables the periodic transmission of the summary report to the core network element, and maintains and updates the summary report during periods when the core network element is inaccessible by the mobile node.

13. The ad-hoc wireless network of claim 12, wherein the mobile node operates a counting mechanism to collect the node usage data comprising separate counts of packet occurrences at the mobile node.

14. The ad-hoc wireless network of claim 13, wherein the mobile separate counts of packet occurrences are selected from a group comprising separate counts of at least one of the following:
   number of data packets and/or octets delivered to the mobile node;
   number of data packets and/or octets sent from the mobile node;
   number of data packets and/or octets routed though the mobile node; and
   number of special service packets and/or octets transmitted to and/or from the mobile node.

15. The ad-hoc wireless network of claim 12, wherein the mobile node stores the collected node usage data as counter values in an Accounting Metrics Table (AMT), wherein the stored counter values are indexed by a specific counter tag identification (ID).

16. The ad-hoc wireless network of claim 15, wherein the summary report comprises counter values and counter tag identifications (IDs) selected from the AMT, wherein a counter value and tag ID are selected if:
   the counter value and tag ID is the product of an enabled counter;
   the counter value and tag is statistically significant; or
   the counter value and tag has been omitted from previous reports beyond an allowed value.

17. The ad-hoc wireless network of claim 12, wherein the mobile node collects the node usage data for a duration of an accounting cycle, comprising a time between which a first summary report and a second summary report is transmitted.

18. The ad-hoc wireless network of claim 17, wherein the accounting cycle is selectable.

19. The ad-hoc wireless network of claim 12, wherein the transmission comprises a packet containing a set of tuples, each tuple of the packet containing a counter tag ID followed by a correctly sized counter value.

20. The ad-hoc wireless network of claim 19, wherein at least one bit of the counter tag ID is reserved for a length selector, and at least one other bit of the tag ID is reserved for unique counter tags, the counter tags in the tuples being encoded with a length selector that identifies a length of a counter value field for the counter values.

21. The ad-hoc wireless network of claim 12, wherein the periodic transmission of the summary report to a core network element includes using a link-layer transport mechanism.

22. The ad-hoc wireless network of claim 12, wherein the core network element comprises node usage accounting and billing systems.

* * * * *

UNITED STATES PATENT AND TRADEMARK OFFICE
CERTIFICATE OF CORRECTION

PATENT NO.         : 7,796,570 B1                                        Page 1 of 1
APPLICATION NO.    : 10/193141
DATED              : September 14, 2010
INVENTOR(S)        : Farley et al.

It is certified that error appears in the above-identified patent and that said Letters Patent is hereby corrected as shown below:

In Column 1, Line 57, delete "perform." and insert -- perform --, therefor.

In Column 6, Line 15, delete "of" and insert -- of: --, therefor.

In Column 6, Line 20, delete "though" and insert -- through --, therefor.

In Column 8, Line 64, in Claim 3, delete "though" and insert -- through --, therefor.

In Column 10, Line 10, in Claim 14, delete "though" and insert -- through --, therefor.

Signed and Sealed this
Twenty-seventh Day of November, 2012

David J. Kappos
*Director of the United States Patent and Trademark Office*